INVENTOR.
Wallace F. Gayring
BY
John P. Murphy
ATTORNEY

Aug. 30, 1960 W. F. GAYRING 2,950,848
CONTROL FOR FOLDING MACHINE
Filed Dec. 22, 1958 5 Sheets-Sheet 3

INVENTOR
Wallace F. Gayring
BY John P. Murphy
ATTORNEY

Aug. 30, 1960 W. F. GAYRING 2,950,848
CONTROL FOR FOLDING MACHINE
Filed Dec. 22, 1958 5 Sheets-Sheet 4

INVENTOR
Wallace F. Gayring
BY
John P. Murphy
ATTORNEY

United States Patent Office 2,950,848
Patented Aug. 30, 1960

2,950,848
CONTROL FOR FOLDING MACHINE
Wallace F. Gayring, Minoa, N.Y.
Filed Dec. 22, 1958, Ser. No. 781,968
5 Claims. (Cl. 223—37)

This invention relates to machines for folding articles, and more particularly, to a control for a machine for folding shirts.

In conventional machines for folding articles such as are now known, the operations and members of the machines have been controlled and actuated to a large extent by a timer mechanism which may include a cam assembly. In such a machine, an electrical timer is utilized to drive a series of cams on a shaft for actuating valves or the like which control the supply of fluid pressure to the operating members of the machine. In order to expedite the operations of the various elements of the machine to complete a folding operation for achieving maximum productivity of the machine, the cams are arranged in close order. That is to say, a minimum of time elapses between the starting of one operation, and the initiating of a succeeding operation. A major disadvantage prevalent among machines of this nature is the effect of wear on the cam surfaces, and close adjustment between operations. Should a cam become worn or should the actuator element driven by the cam become worn any given operation of the machine may be initiated too early with respect to a preceding operation, or too late with respect to a succeeding operation. Thus, the various operating elements of the machine may be caused to become jammed, or operations may be overlapped with respect to time duration. The result is a deleterious effect in the overall operation of the machine, and may be in the form of breakage, mis-alignment of the operating members, and the like.

It is therefore a primary object of this invention to provide a control for an automatic machine for folding garments in which each operation is dependent on the completion of the preceding operation and the certainty of the sequence of operations is assured.

It is a further object of this invention to provide a control for an automatic folding machine, which control utilizes the power derived from the single source of power for operating the machine.

It is a further object of this invention to provide control for a folding machine which, due to the inherent simplicity thereof and the features of the foregoing objects, is adapted to simplify and lighten the burden of maintenance of the owner or operator of the machine.

Other objects and advantages will become apparent from the following specification, when taken with reference to the accompanying drawings.

In accordance with the present invention, there is provided a control for a machine for automatically folding articles wherein a source of power for operating the machine is utilized for introducing certainty to the sequence of the various operations of the machine; and wherein the source of power for operating machine is the same source of power for controlling the operation of the machine.

Figure 10:
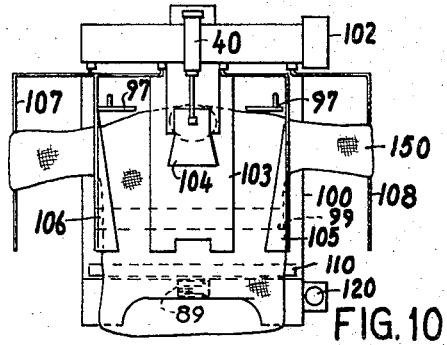
Figure 11:
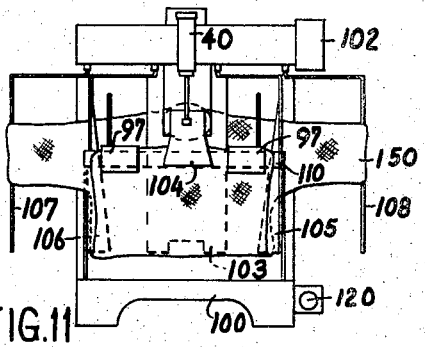

Figures 10 and 11 respectively illustrate diagrammatically certain of the folding sequence of the machine, according to the features of the invention.

Figure 12:
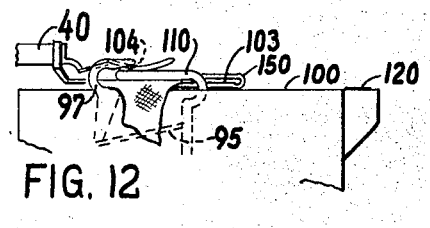
Figure 13:
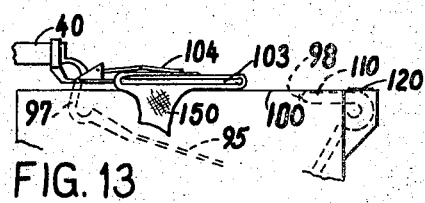

Figures 12 and 13 respectively illustrate diagrammatically certain other folding operations of the machine, according to the features of the invention.

Figure 14:
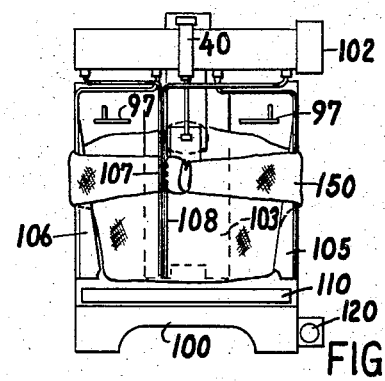
Figure 15:
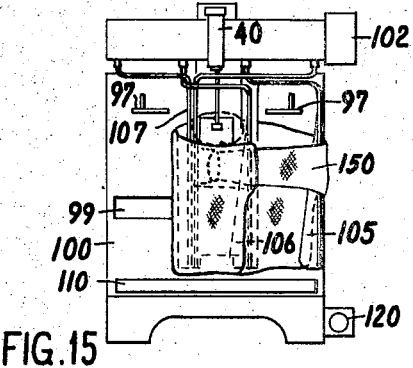
Figure 16:
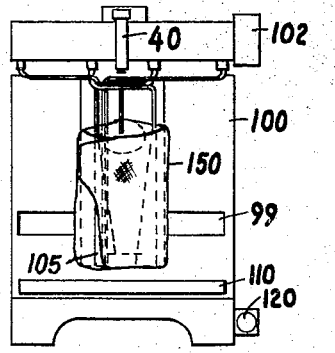

Figures 14, 15 and 16 respectively further illustrate diagrammatically the final folding operations of the machine, according to the features of the invention.

Figure 1:
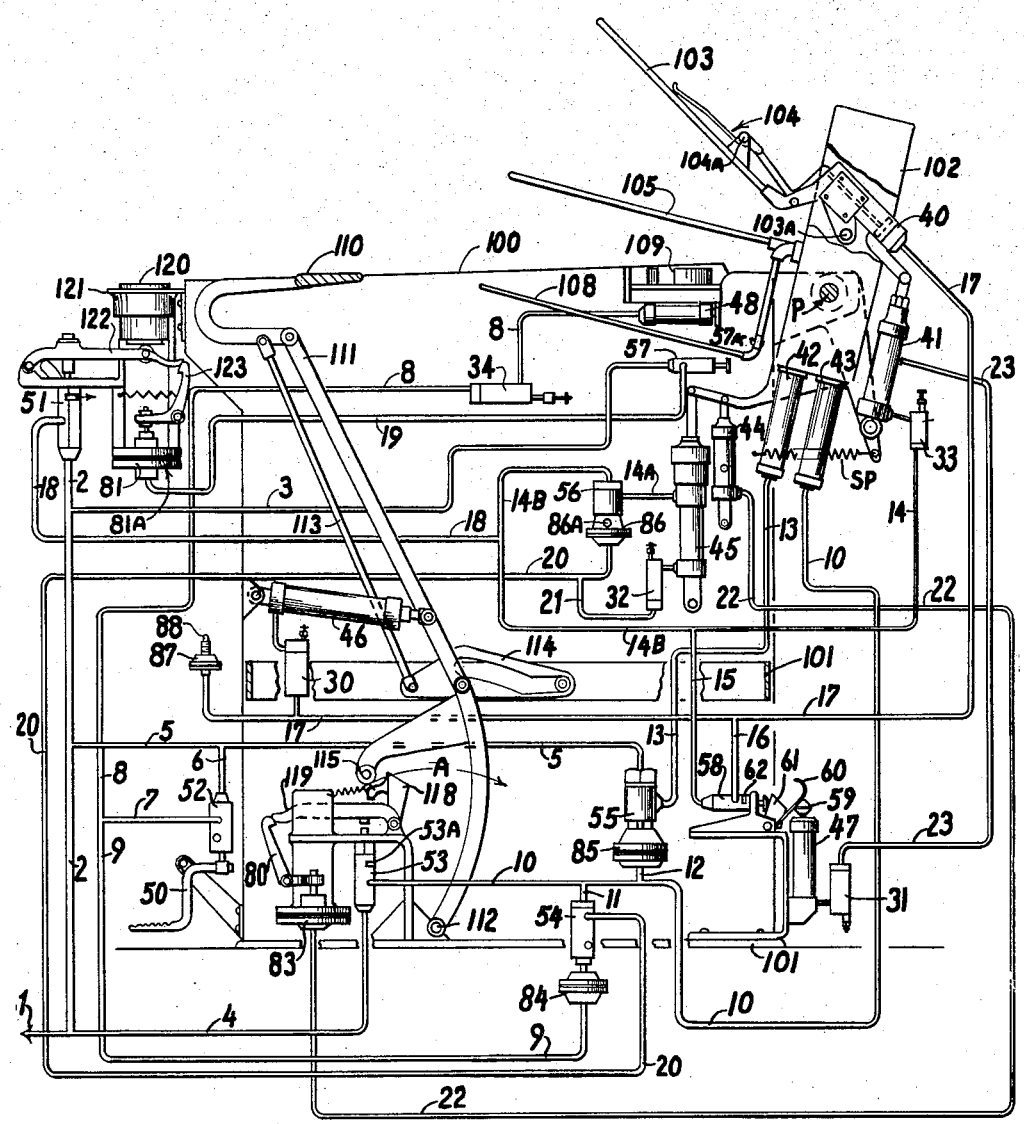
Figure 1 is a diagrammatic illustration of the invention as applied to a machine.
Figure 3:
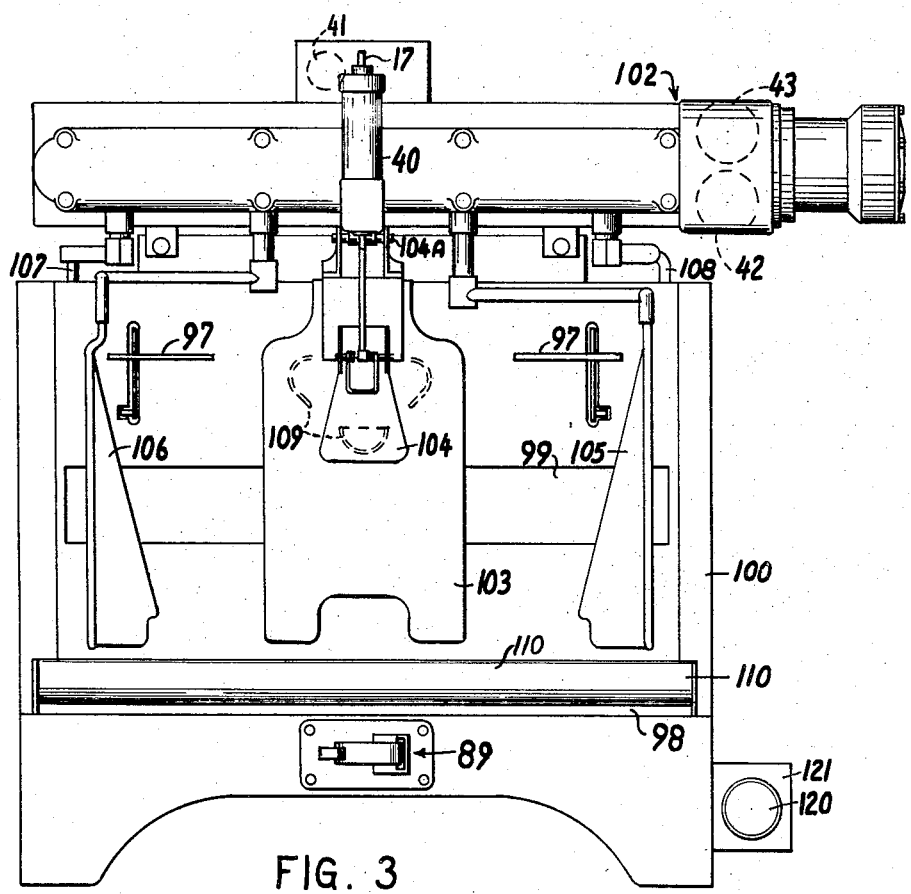
Figure 3 is a plan view of a machine adapted to be controlled by the invention.
Figure 4:
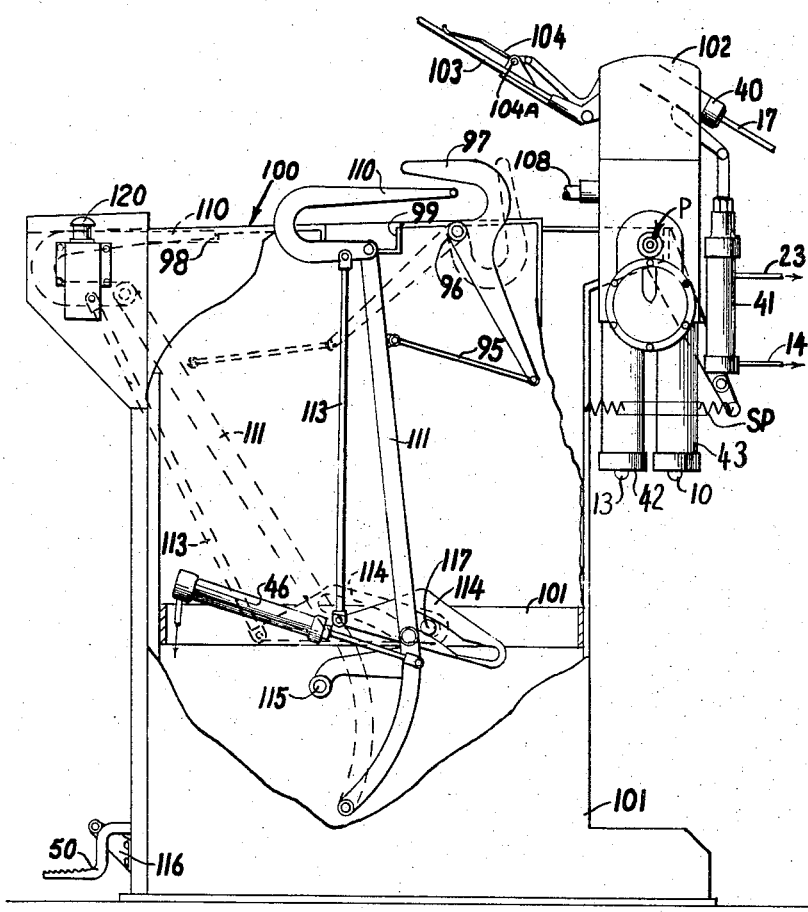
Figure 4 is a side elevation of a machine adapted to be controlled by the invention, with portions cut away.

As to the construction of an embodiment of the present invention, a machine is disclosed which is particularly adapted for use for folding shirts and like garments; although the invention is not limited for use with such a machine. In its broader aspects the invention is useful with many machines as constructed to perform different types of operations, as will appear. The machine as is illustrated and disclosed herein is similar to that disclosed in application Serial Number 670,131, filed July 5, 1957, for Shirt Folding Machine, by Wallace F. Gayring and Henry Uhlig. Thus, a machine for folding a shirt is illustrated with the surface thereof herein referred to as a folding table 100. With reference to Figures 1 and 4, the front of the machine is at the left of the view, and the back of the machine at the right. In Figure 3, the front of the machine appears at the bottom of the figure, and the back of the machine at the top of the figure, as would be viewed by the operator of the machine.

The general construction of the machine for foldable articles is illustrated in Figures 3 and 4. A suitable frame 101 may be provided with or without a protective housing or casing therearound. The folding table 100 is supported by the frame 101, and may be of such proportionate shape and dimension to accommodate a style or type of garment for which the machine is to be used.

A cam drum unit 102 may be pivotally mounted as at P, and contains the operative mechanism for actuating and operating the folding arms of the machine. The cam drum unit 102, or folding unit, includes a pair of inner folding arms 105 and 106, and outer folding arms 107 and 108. An opening cylinder 42 is adapted to actuate the arms 105, 106, 107 and 108 to the open position, substantially as shown in Figure 3; and a closing cylinder 43 is adapted to actuate the arms to a closed position for folding a garment, as will appear. The entire unit 102 is adapted to be pivoted about the pivot P for raising and lowering the arms and other mechanisms respectively away from and towards the table 100.

A folding form or folding blade 103 is supported by the unit 102, and is adapted to be lowered to a position closely overlying the table 100 as in Figure 3. The form 103 may be raised by means to be described to a position as shown in Figure 4.

A recess 99 may be formed in the table 100 for receiving a supply of bands or the like, which may be placed around a finished, folded shirt.

A collar former 109 is shown in the dotted line position, and may be of any conventional type known in the art. A shirt placed on the table is in a position face or front down, so that the collar thereof is adapted to be placed around the former 109. The former 109 may then be expanded to hold the shirt in position, and to shape the collar. The collar former 109 is adapted to be provided with collar former blocks of different style or shape to accommodate the different styles of collars found on shirts.

A tail folder bar 110 may be positioned in the normal position in a suitable recess or the like 98 in the table 100. The tail folder bar 110 extends transversely of the table 100 as shown in Figure 3. Figure 4 illustrates the construction of the bar 110. A tail folder actuator rod 111 is pivotally mounted at its lower end to any suitable portion of the frame 101, and is pivotally attached at its upper end to the bar 110. A radius rod 113 may be pivotally attached at its lower end to the table frame 101, and at its upper end to the bar 110 at a distance spaced apart from the attachment of the rod 111. As the tail folder 110 is actuated from the normal position shown by the dotted lines to the operating position shown in solid lines, the radius rod 113 maintains the bar 110 in a substantially parallel position with respect to the table 100. Thus, the rods 111 and 113 act in parallelogram fashion. A tail retaining lever 97 may be positioned to either side of the folding form 103, and pivotally attached as at 96 to the table 100 or frame 101. A link 95 is pivotally connected between the lever 97 and the actuator rod 111. When the tail folder 110 and actuator rod 111 are actuated to the normal position (dotted line in Figure 4), the retaining lever 97 assumes the position shown in Figure 3, and in dotted lines in Figure 4. When the bar 110 is actuated to the operating position to fold the tail of a shirt over the form 103, the retaining lever 97 moves to the solid line position as in Figure 4, as will be further described. A cylinder 46 is adapted to be actuated for actuating the tail folder assembly.

A cam plate 114 may be pivotally attached to rod 113. As the tail folder 110 is actuated to move from the dotted line position to the solid line position as in Figure 4, the cam plate 114 is moved so that the slot in the plate 114 follows cam element 117, thus maintaining the tail folder bar 110 substantially parallel with the table 100.

Figure 5:
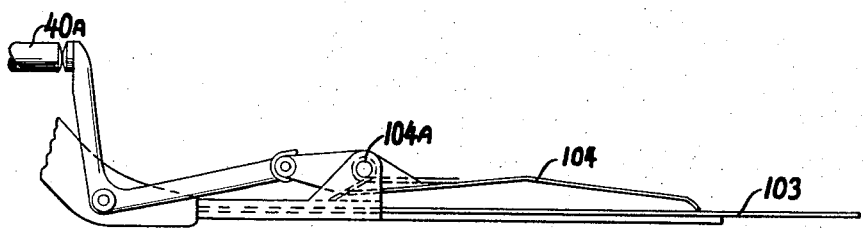
Figure 5 is an enlarged elevation of the tail clamping mechanism machine, in part.

A tail clamp 104, Figure 5, is pivotally mounted at 104A for holding the tail of a shirt in folded position over the form 103, and may be actuated by piston rod 40A of cylinder 40, as will appear.

Figure 2:
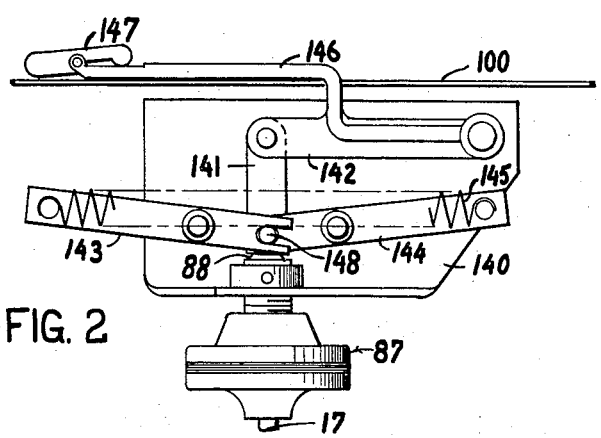
Figure 2 is an elevation of a button strip clamp for a machine as in Figure 1.

A button strip clamp may be positioned as at 89 in the table 100, if desired. The clamp assembly 89 is disclosed in an application of Emil A. Winnewisser, serial number 678,630, filed August 16, 1957 for "Button Strip Retaining Means." The clamp 89, shown in Figure 2, is actuated to retain the button strip and button hole strip of a shirt in intended position during a certain period of the operation of the machine, as will appear.

A supporting bracket 140 is mounted beneath the surface of table 100. A link 142 and a clamp arm 146 are pivotally attached to the bracket 140, with one end of the arm 146 disposed through an opening in the table 100. A clamping lever 147 is pivotally attached to the extended end of arm 146. Actuation of the diaphragm assembly 87 causes the diaphragm plunger 88 to be urged outwardly against one end of a link 141. The opposite end of link 141 being connected to one end of link 142; link 142 and arm 146 will be lifted, so that lever 147 will be raised above the table 100. Spring arms 143 and 144 are moved about their pivotal mountings by pin 148, and, through the urging of the spring 145, lock the assembly in the open position. Manual depression of the lever 147 by the operator will return the elements of the assembly to the position shown in Figure 2.

A foot pedal 50 may be conveniently positioned near the floor upon which the machine rests for actuation by the foot of the operator. An operating button 120 is conveniently positioned on the table 100, or to a side thereof, and may be supported by any suitable frame member 121.

Figure 1 diagrammatically illustrates the invention as applied to a machine according to the foregoing description. The operating elements of the machine and the control therefor are all operated by fluid pressure, which may conveniently be air under pressure. The fluid pressure is supplied to the machine through a main line 1. Pressure travels through branch line 2 to lines 5 and 6 directly to a valve 52. Actuation of valve 52 by the foot pedal 50 when actuated or depressed by the operator supplies pressure directly to the collar former 109 through line 7 and line 8. The cylinder 48 receiving pressure from line 8 collapses or retracts the elements of the collar shaper 109 to permit the operator to place a shirt collar therearound. A conventional needle valve 34 is positioned in line 8 between the valve 52 and the cylinder 48. The needle valve 34 is adjusted so as to supply pressure at a controlled rate to the collar shaper cylinder 48 to control the speed of actuation of the blocks of the collar shaper or former 109. Opening of valve 52 by the foot pedal 50 also supplies pressure to diaphragm 84 through branch line 9, connected to line 7. However, at this time there is no pressure in valve 54, as will appear. Release of the foot pedal 50 allows pressure to be released from valve 52, and from the collar shaper cylinder 48, permitting spring action within the expander of the former 109 to cause the blocks of the former 109 to expand, thus holding a collar in position thereon.

Figure 6:
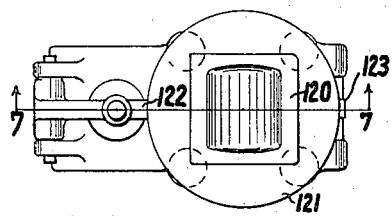
Figure 6 is an enlarged plan view of a portion of the initiating valve of the machine.
Figure 7:
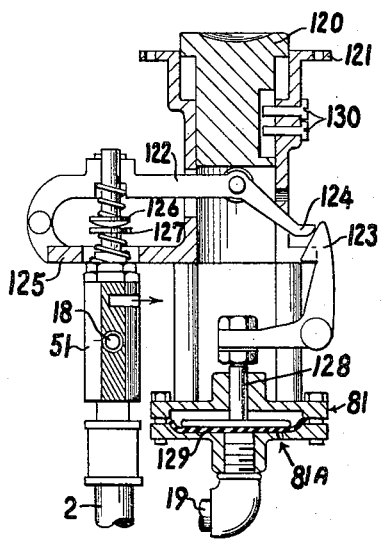
Figure 7 is an enlarged side sectional view taken along the line 7—7 in Figure 6.

Pressure is also supplied at all times through main branch line 2 to valve 51, which is normally in the closed position. The operating or starting button 120 mechanically opens the valve 51 when depressed, and a latch lever 122 and latch 123 mechanically lock the valve 51 open. Figures 6 and 7 illustrate the valve 51 and the locking mechanism therefor. Branch line 2 supplies pressure to the end of the valve 51, and a line 18 transmits the pressure from the valve when the valve is opened. Actuation of the button 120 by depressing of the same causes the lower end of the button to bear against the pivotally mounted latch lever 122, causing the plunger 126 to bear against the stem 127 of the valve, opening the valve. One end 124 of the latch lever 122 becomes caught under the pivotally mounted latch 123. To release the latch 123 and lever 122 for closing the valve, it is necessary to supply pressure through line 19 to the underside of the diaphragm 129 in the release assembly 81. Pressure against the underside of the diaphragm 129 forces plunger 128 upwardly against one end of the latch 123, releasing the end 124 of lever 122 by pivoting the latch 123 on its pivot. The springs on plunger 126 and stem 127 urge the lever 122 upwardly, also raising the button 120 to a normal position as the valve 51 is closed. Suitable means such as set screw stops 130 may be positioned in the housing 121 for regulating the length of travel of the button 120, and hence the movement of the lever and latch mechanism. It is also seen that the various components of the assembly may conveniently be carried by the housing 121.

The collar shaper cylinder 48 may be of a substantially conventional type wherein the piston is extended upon application of pressure in the cylinder. The tail clamp operating cylinder 40 is provided whereby pressure applied to the interior thereof will cause the tail clamp 104 to open to the position diagrammatically shown in Figure 5; and wherein release of the pressure will cause the tail clamp to return to the position shown in Figure 1. The tail clamp cylinder 40 receives pressure through branch line 17 from line 16.

The shirt folding blade or form 103 is pivotted about the mounting pivot 103A by means of cylinder 41, which receives air or the like pressure through line 14 from line 18. The needle valve 33 is positioned in line 14 to control the flow of pressure to the cylinder 41, thus regulating the speed at which the form is moved about its pivot 103A. A port in the side of cylinder 41 may be provided with a line 23 leading to cylinder 47 through needle valve 31, which controls the speed of operation of cylinder 47. When the piston (not shown) in cylinder 41 passes the port, pressure is supplied through line 23 to cylinder 47. A cam 59 is provided on the end of the piston shaft 49 (Figure 9) of the cylinder 47. The valve 58 is actuated by a pivotally mounted actuator 61 having a cam engaging element 60 thereon. The valve 58 receives pressure through lines 15 and 14 from line 18, and is normally closed. When piston 49 moves cam 59 to position 59A, the valve 58 is opened, and pressure travels through line 16. When the cam moves to the position 59B, the valve 58 is closed again. Thus, the valve may be opened in one position of cam 59, and closed in two positions of the cam 59.

Figure 8:
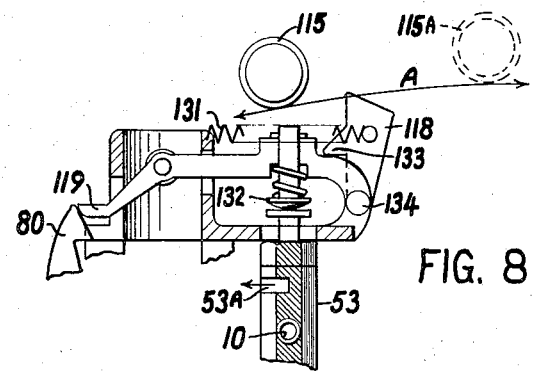
Figure 8 is an enlarged side sectional view of a portion of the valve for the operation of the folding arms of the machine, in part.

Another self-locking valve 53 is adapted to be operated by the action of the extension 115 of the tail folding bar support rod 111, as it moves through the arc defined by arrow A upon its return stroke. Cross reference to Figures 1 and 8 illustrates the similarity between the latch and lever mechanism of valves 51 and 53. However, the latch and lever mechanism for valve 53 differs from the other in that the actuation is by way of a cam 118, which is pivotally mounted as at 134. A spring 131 holds the cam 118 normally in the position shown in Figure 8, with the projection 133 bearing on the latch lever 119. Movement of the tail fold bar extension 115 from the solid line position to the position 115A in Figure 8 will move the cam 118 pivotally away from the position shown; and the spring 131 will move the cam back to its normal position after the extension 115 reaches the position 115A. Movement of the cam-engaging extension 115 toward the solid line position, or on the return stroke, along the arc defined by arrow A causes the extension 115 to engage the cam 118, causing the projection 133 to bear downwardly on the lever 119, depressing plunger 132 to open the valve 53. At this time, the latch 80 retains the lever 119 in the downward position, retaining the valve 53 in the open position. Actuation of the diaphragm unit 83 releases the latch 80, allowing the valve 53 to be closed in a manner similar to the closing of the valve 51.

The operation of the control is as follows: In operating the various elements of the machine, there are two distinct sequences of operation; the folding or closing sequence, and the opening sequence.

The primary operations to be performed during the folding or closing sequence are best illustrated in Figures 10 to 16. A shirt 150 is placed on the folding table, front down, with the collar button buttoned. The collar is placed around the collar shaper 109 and is retained thereby, thus holding the shirt 150 in position on the table. The button strip and button hole strip of the front of the shirt are properly placed in the button strip clamp assembly 89, which will be in the open position.

The operator presses downwardly on the lever 147 and the clamp is thus operated to hold the strips in the position they will occupy after the shirt is folded and removed from the table. The various operations that are performed are the folding of the tail of the shirt, folding of the right and left sleeves across the tail and back of the shirt, and folding of the left and right sides of the body of the shirt across the tail, sleeves and back of the shirt. Following banding of the shirt by the operator, the finished, folded shirt is removed from the machine and folding elements.

The folding or closing sequence will now be described.

The folding or closing sequence is controlled exclusively by pressure entering main line 1. After the operator places the shirt 150 on the folding table 100, she depresses foot pedal 50, which opens valve 52, admitting air from main line 1 and branch line 2 directly to the collar shaper cylinder 48, collapsing the shaper 109 for application of the shirt collar thereto. In addition to air traveling through branch line 8 to the cylinder 48, the air also travels through branch line 9 from line 7 to the inlet of the diaphragm 84, which operates valve 54. Because the pressure inlet line 11 of the valve 54 is connected to the outlet line 10 of valve 53, which is closed at this time, no pressure is supplied to valve 54, and therefore, no air is passed beyond this point.

After positioning the collar of the shirt 150 properly on the collar shaper 109, the operator releases the foot pedal 50, allowing air to exhaust from valve 52, exhausting air from the collar shaper cylinder 48, and also from line 9. The collar shaper 109 expands, holding the collar of the shirt in clamped position. The diagrammatic illustration in Figure 1 best illustrates the operation of the control.

To initiate the folding or closing sequence subsequent to placing the collar on the collar shaper, it is to be understood that the folding arm unit 102 is in the open tilt position as shown in Figure 1. This is to place the folding arm unit in a position so as to facilitate placing of the shirt on the table. The folding form or blade 103 is also in a tilt position, substantially as shown in Figure 1.

To start the operation of the machine, the operator depresses the start or operating button 120, which locks the valve 51 in the open position, as hereinabove described. Fluid pressure from the main branch line 2 passes through the valve 51 through line 18 to line 14. The pressure enters the top of the valve 56 (normally open) and thence through line 14A to the upper end of the tilt cylinder 45. This action causes the cam drum and folding arm unit 102 to pivot downwardly on pivot P so that the folding arms are substantially parallel with the table surface, and the folding form 103 is caused to closely overlie the table 100 and parallel thereto above the collar shaper and the back of the shirt. This latter operation is accomplished by means of air passing through line 14B and needle valve 33 to the folding blade cylinder 41, causing the blade to be pivotted on its mount 103A. Thus, as shown in Figure 10, the shirt 150 is on the table with the sleeves draped over the outer folding arms 107 and 108; and the inner folding arms 105 and 106 and the blade 103 overlie the shirt. It will also be seen that the opening of valve 51 admits pressure from line 14 to line 15 and into the normally closed valve 58.

As the piston (not shown) of the folding blade cylinder 41 passes the port connection for line 23, air is admitted into line 23 and thence through needle check valve 31 to the inlet of cylinder 47. The cam 59 is raised to engage the cam actuator 60 and 61 to open the valve 58. This valve 58 is opened only momentarily as the upward action of the piston of cylinder 47 causes the cam 59 to pass the actuator 61. The opening of valve 58 admits pressure through line 16 to the double branch line 17. Through one branch of line 17, pressure travels to the tail clamp cylinder 40, to momentarily open the tail clamp 104. Pressure also travels through the other branch of line 17 to operate the diaphragm chamber 87, causing the plunger 88 to release the button strip clamp as disclosed hereinabove, and in the above-mentioned application Serial Number 678,630. As the chamber 87 is actuated, pressure travels through needle check valve 30 to the tail folder actuating cylinder 46, moving the actuator rods 111 and 113 about their pivots to move the tail folding bar 110 into fold position as hereinabove described. In Figures 1 and 4 a cam plate 114 is illustrated as being pivotally attached to a frame member 101, by means of which the rod 113 may be caused to maintain the bar 110 in intended position. The tail of the shirt 150 is then folded upwardly over the body portion by the bar 110, as shown in Figures 11 and 12. As the bar 110 carries the tail portion of the shirt into folded position, the levers 97 prevent the tail from throwing away from the fold bar 110.

Figure 9:
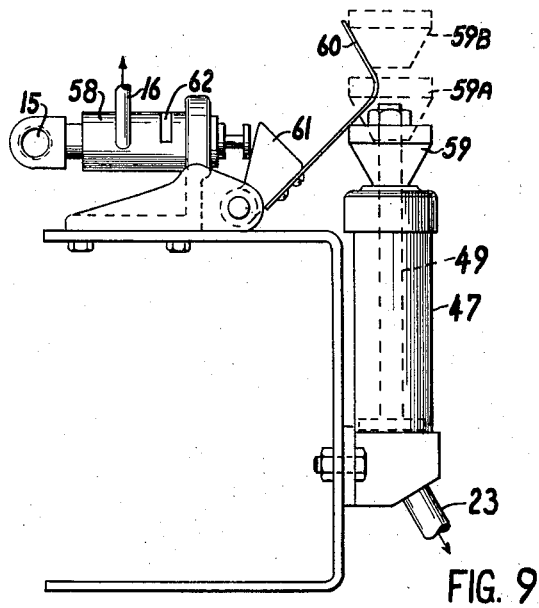
Figure 9 is an elevational view of the valve for the operation of the tail folding and tail clamp mechanism of the machine.

Due to the valve 58 being now in exhaust position, the tail clamp is momentarily in the open tilt position by the action of a full stroke of cylinder 47, Figure 9. The tail clamp 104 now contacts the tail portion of the shirt and holds it from following the folding bar 110 on its return to normal position. This also releases air pressure through the exhaust 62 from the cylinder 40, cylinder 46, and diaphragm chamber 87. The release from cylinder 46 allows the tail folding bar 110 to start its return stroke to the position in the recess 98. This is diagrammatically illustrated in Figure 13. During the return stroke of the tail folding bar 110, the supporting arm 111 carries the extension 115 thereof against the cam 118 of the self locking valve mechanism along an arc defined by the arrow A, actuating the cam. As described hereinabove, the valve 53 is opened, and pressure is admitted to the diaphragm chamber 85 through line 10 and branch 12 to actuate the reverse valve 55, thus shutting off the air supply to the arms opening cylinder 42. Air pressure is also admitted from valve 53 through line 10 directly to the arms closing cylinder 43 to actuate the folding arms 105—108 for folding the sleeves and body portions of the shirt 150 on the table. The sequence of operation of the folding arms is disclosed in the above-mentioned application Serial Number 670,131, and is further shown in Figures 14, 15 and 16. The outer folding arms 107 and 108 are actuated by the unit 102 to fold the sleeves of the shirt 150 inwardly across the back of the shirt, and the inner folding arms 106 and 105 are then actuated to fold first one side portion and then the other across the back portion of the shirt. Air pressure is also admitted through line 11 to the inlet port of valve 54, which is closed because no pressure is present at this time to actuate the diaphragm chamber 84 to open valve 54. It should be noted that the valve 53 remains locked open during the closing operation of the folding arms 105—108 by closing cylinder 43, and for a period of time following the closing of the folding arms. The above completes the folding of the shirt, or closing, sequence of operation of the machine. It is pointed out that the above description is made with the assumption that all operative adjustments have been made to the machine previous to operation, and that the machine elements are all in a position following the complete folding operation of a shirt or like garment prior to the description of the operation for folding the shirt 150 as shown.

The opening sequence may be described as follows: However, it may be well to review the position of the various elements of the machine following the folding or closing sequence.

Starting valve button 120 is in the down, or depressed, position, with valve 51 locked in the open position. The tail folding bar and assembly has actuated the cam 118 and latch 80 and 119, locking the valve 53 in the open position, where it remains so opened. The folding arm unit 102 is in the lowered position and the folding arms 105—108 are folded, with shirt 150 thus folded thereby about the form 103 as in Figure 16. Tail clamp 104 is in position engaging the tail portion over the back of the body portion of the shirt 150, the tail fold bar 110 in its normal position as in Figures 1 and 10. The collar shaper is in the normally expanded position, engaging the inside of the collar of the shirt for holding the shirt in position on the table, as well as for shaping the collar of the shirt.

With the elements of the folding machine in substantially the position as described above, operation of the foot pedal 50 will start the opening sequence. As the operator depresses the foot pedal 50:

Air is admitted to the collar shaping operating cylinder 48, retracting the blocks of the collar shaper 109 to the collapsed position, and releasing the collar of the shirt 150. Air is admitted to the diaphragm chamber 84 through line 9 from line 7. The diaphragm chamber 84 opens valve 54, which admits air pressure to the diaphragm chamber 86 of reverse valve 56 through line 20. The chamber 86 actuates and closes the valve 56, which shuts off the supply of pressure from line 18 and line 14 to the top end of the tilt cylinder 45, permitting air in the cylinder to be exhausted through an exhaust port 86A of valve 86. Pressure is also admitted from line 20 through branch line 21 to the needle check valve 32 and thence to the bottom end of the tilt cylinder 45. This action forces the piston (not shown) in the cylinder 45 toward the upper end. The cam drum unit 102 is tilted around its pivot P, carrying the folding arms and form 103 to the tilt position with the folded shirt thereon. In this position, the operator is then permitted to remove the folded shirt from the form and folding arms by grasping the shirt and pulling it toward the front of the table 100 so that the shirt will slide off of the form and the folding arms. Before removing the folded shirt from the blade 103, the operator may place a band or other retaining means.

After removing the folded shirt, the operator releases the foot pedal 50, which:

Closes valve 52, releasing air from the collar shaper operating cylinder 48, permitting the blocks of the collar shaper 109 to return to the normally expanded position. Releases the air from the diaphragm chamber 84 of valve 54. Thus valve 54 is closed and the air is released from the diaphragm chamber 86 of valve 56. This closes the air feed to the lower port connection through line 21, and admits air through lines 18, 14 and 14A to the upper port connection of the tilt cylinder 45, thus moving the cam drum unit 102 and folded arms from a tilt position to the level position over the table 100.

As the tilt cylinder 45 moves the folded arms and unit 102 to the level position, the arm connected to cylinder 45 also operates the piston of the cylinder 44, which is a release cylinder. As the piston compresses air to a slight degree in cylinder 44, the compressed air therein travels through line 22 to the diaphragm chamber 83 of the self locking valve 53. It should be pointed out that the cylinder 44 admits substantially a "puff" of air to the chamber 83, inasmuch as all that is needed is to momentarily pivot the latch member 80 to release the latch level 119. As the latch lever 119 is released, valve 53 is closed. It will become apparent that there is no pressure supply from the main pressure line 1 to the cylinder 44 or the line 22. As the cylinder 44 is actuated, air is compressed therein momentarily, which actuates the diaphragm chamber 83. The chamber 83 is the same type as the chamber 81 illustrated in Figure 7, wherein the plunger 128 opens the latch 123. After the chamber 83 is actuated, the compressed air in line 22 and cylinder 44 exhausts through a bleed hole 81A in diaphragm chamber 81.

With the closing of valve 53 by the action of chamber 83, three operations occur. Pressure no longer is admitted through line 11 to the inlet of valve 54. Pressure is no longer admitted through line 10 to the folding arms closing cylinder 43, which pressure in cylinder 43 exhausts through exhaust port 53A. The pressure in line 12 actuating the diaphragm chamber 85 is exhausted thru port 53A and the reverse valve 55 is opened, which admits pressure through line 13 directly to the arms opening cylinder 42. This cylinder 42 actuates the cam drum unit 102 to unfold or open the folding arm 105—108.

In Figure 1, a dotted line showing of valve 57 illustrates the actual position whereby the plunger of valve 57 is adapted to be actuated by the folding arm 108 when the arm 108 reaches its full open position. Pressure is constantly admitted to the inlet port of valve 57 through branch line 3 from the main branch line 2. When the folding arms 105—108 swing to the open position, the movement of the arms is substantially rapid. As arm 108 opens against any suitable stop (not shown), it momentarily swings against the operating stem or plunger for the valve 57. Valve 57 is in a position shown in dotted line 57A with arm 108 striking the operating button of valve 57. Pressure is momentarily admitted through line 19 to the diaphragm chamber 81, which releases the latch 123 and latch lever 122. The starting button 120 is moved upwardly to a normal position, and the valve 51 is caused to close, by the release of the plunger 126 from the valve stem 127 as the latch lever 122 is released by latch 123. It is to be understood that the valve 57 is not constantly operated by the arm 108 when the arm in the open position, but is actually operated by the excess play or travel when the arm 108 swings to the full open position. As the arm 108 remains in the open position, there is sufficient clearance between the arm and the stem of valve 57 to prevent constant opening of the valve 57.

With the opening of the valve 51 by the release mechanism, air is prevented from entering line 18 to line 14 and the folding cylinder 41, and the folding blade or form 103 returns to the open or tilt position. As the folding blade 103 returns to the open position, and the piston in the cylinder 41 passes the port connection of line 23, pressure is released from line 23 and cylinder 47. The piston 49 carries the cam 59 downwardly from the position 59B through the open position 59A, which opens the valve 58 momentarily. However, no pressure is released from valve 58, inasmuch as the pressure supply through line 15 to the valve 58 has been shut off with the closing of valve 51, and the cam 59 continues to travel downwardly to return to its normally lowermost position. The pressure supply has been shut off to the valve 56 and tilt cylinder 45 by valve 51, and the tilt cylinder 45 returns to the normal, or open tilt position. A suitable spring SP on the cam drum unit 102 may be employed to return the unit 102 to the normal tilt position. This completes the opening sequence, and the folding machine is not ready to receive a succeeding shirt for folding.

It will become apparent that the elements of the machine are now in the same position they occupied at the start of the folding sequence, when the shirt 150 was placed on the folding table.

It will become apparent to those skilled in the art that in certain cases it has been found that shirt boards, or cardboards, are well adapted for use with the form 103 about which a shirt may be folded. In this case, the cardboard is in the size and shape to which the shirt will be folded. The cardboard is generally used when shirts are banded and not when the shirt is placed in a container. The machine is not to be limited to the specific apparatus shown, but may also include other devices such as manual or machine banding devices for placing a band around the finished folded shirt; and may also include devices for placing a wrapper of some kind about all or most of the folded shirt following the folding operation.

In carrying out the objects of this invention, there is thus provided a machine for folding a shirt having a table for receiving the shirt, holding means comprising a collar shaper for retaining a shirt on the table, a form about which the shirt may be folded, a first folding means comprising a tail folding bar and actuating assembly for folding a portion of the shirt, a second folding means comprising the folding arms for folding the sleeves and body portions of the shirt about the form, an operating means for the above elements of the machine or apparatus, and a power means for the operating means. The control for the apparatus initiates a sequence of operations of the above means in response to actuation of the operating means by the power means. Thus, the control for all of the above actually comprises the operating means and the power means, where the power means includes the source of fluid pressure, and the operating means includes the valves, lines, cylinders, operating button and pedal, and other assemblies which perform the operations of the machine. Actuation of the operating means by the power means causes the operating means to apply the power means sequentially in response to operation of the operating means. That is to say, any given operation of elements of the apparatus, upon completion of that operation, causes the initiation of a succeeding operation or operations. Thus, the control for the apparatus comprises the power means and the operating means; and sequentially initiates the operation of the elements of the machine including the holding means, folding means and form in response to actuation of the operating means by and of the elements of the machine.

It is also seen that the apparatus for folding a shirt includes a table or surface for receiving the shirt to be folded, a collar retaining means, button strip retaining means, a manual control means for the collar retaining means, manual control means for the button strip retaining means, folding means for the tail portion of the shirt, folding means for the sleeves and body of the shirt, whereby the folding means perform sequential folding operations of the apparatus upon the shirt, power means for operating and releasing the folding means and operations thereof; whereby one of the manual control means is for starting one of the sequential folding operations and for releasing one of the retaining means, and the other manual control means is for the releasing of the folding means and for releasing the other retaining means. Each folding operation is dependent for its initiation on the completion of a preceding operation.

While a specific modification of the invention has been illustrated and described, it is to be understood that the invention is not to be limited to the form disclosed, but is to be construed as fairly falls within the true spirit and scope of the appended claims.

I claim:

1. A control for a folding machine, said machine including a table, holding means for a shirt placed on said table, a form about which a shirt is to be folded, fluid pressure folding means for folding portions of a shirt about said form; fluid pressure operating means for the operation of elements of said folding means in predetermined sequence, fluid pressure power means for said operating means; said control comprising said operating means and said power means, said control sequentially initiating the operations of said folding means in response to the actuation of said operating means by said power means.

2. In a folding machine including a table, holding means for a shirt placed on said table, a form about which a shirt is to be folded, fluid pressure folding means for folding portions of a shirt about said form, fluid pressure operating means for the operation of elements of said folding means in predetermined sequence and fluid pressure power means for said operating means; a control for sequentially initiating the operations of said folding means in response to the actuation of said operating means by said power means, said control comprising said operating means and said power means.

3. Apparatus for folding a shirt comprising, a surface for receiving a shirt to be folded, collar retaining means, button strip retaining means, first manual control means for said collar retaining means, second manual control for said button strip retaining means, fluid pressure folding means for the sequential folding operations of a shirt, fluid pressure power means for operating and releasing said folding means; said second manual control means being for starting the first of said sequential folding operations and for releasing said button strip retaining means, said first manual control means being for releasing said collar retaining means for releasing said folding means.

4. Apparatus for folding a shirt comprising a table for receiving a shirt, more than one means for retaining a shirt in position for folding, a first folding means for folding the tail of a shirt, second folding means for folding the sleeves and body portions of a shirt, a first manually operated starting control for initiating said first folding means, the sequential operation of said second folding means being controlled by the completion of said first folding means, automatic means for releasing one of said retaining means, and second manually operated means for initiating the release of said folding means and the release of the second said retaining means.

5. Apparatus for folding a shirt comprising a table for receiving a shirt, means for retaining a shirt on said table, first manual means for initiating sequential folding operations of said apparatus, second manual control means for initiating release of the folding operations of said apparatus, sequentially operated folding means for folding the complete shirt following operation of said first manual means; whereby each folding operation is dependent on the completion of a preceding operation, said second manual control means initiating a release means for releasing said retaining means and releasing said first manual control means.

References Cited in the file of this patent
UNITED STATES PATENTS

| | | |
|---|---|---|
| 2,616,594 | Calder et al. | Nov. 4, 1952 |
| 2,665,039 | Neckel | Jan. 5, 1954 |
| 2,687,832 | Westwood | Aug. 31, 1954 |